United States Patent [19]
Akimoto et al.

[11] Patent Number: 5,701,537
[45] Date of Patent: Dec. 23, 1997

[54] CAMERA SHUTTER

[75] Inventors: Kazuo Akimoto; Seiichi Imano, both of Yotsukaido, Japan

[73] Assignee: Seiko Precision Inc., Japan

[21] Appl. No.: 410,056

[22] Filed: Mar. 24, 1995

[30] Foreign Application Priority Data

Mar. 24, 1994 [JP] Japan .................... 6-053785

[51] Int. Cl.⁶ .................................................. G03B 9/08
[52] U.S. Cl. .................................................. 396/463
[58] Field of Search ................. 354/234.1, 250, 354/230, 254; 396/246, 463, 469, 470, 502

[56] References Cited

U.S. PATENT DOCUMENTS

| | | | |
|---|---|---|---|
| 4,395,104 | 7/1983 | Lange | 354/430 |
| 5,028,946 | 7/1991 | Shinozaki et al. | 354/250 |
| 5,045,873 | 9/1991 | Shinozaki et al. | 354/234.1 |
| 5,420,660 | 5/1995 | Akimoto et al. | 354/400 |
| 5,434,714 | 7/1995 | Kohmoto et al. | 359/740 |
| 5,619,741 | 4/1997 | Lee et al. | 396/463 |

Primary Examiner—Safet Metjahic
Assistant Examiner—Christopher E. Mahoney
Attorney, Agent, or Firm—Adams & Wilks

[57] ABSTRACT

A camera shutter includes a driving member rotated in forward and reverse directions by a motor and having first and second control portions. A switching circuit switches an operating starting position of the driving member between first and second positions. An opening member is controlled by the first control portion of the driving member and a first biasing member biases the opening member in the direction of opening the shutter. A first restraint member restrains an operation of the opening member and resists the bias of the first biasing member. A closing member is controlled by the second control portion of the driving member and a second biasing member biases the closing member in the direction of closing the shutter. A second restraint member restrains an operation of the closing member and resists the bias of the second biasing member. When the driving member starts its operation from the first position, the opening member is restrained by the first control portion of the driving member, and when the driving member starts its operation from the second position, the opening member is restrained by the first restraint member.

9 Claims, 12 Drawing Sheets

1

CAMERA SHUTTER

BACKGROUND OF THE INVENTION

The present invention relates to a camera shutter and, more specifically, to a camera shutter which not only allows a selection to be made in accordance with photographing conditions between opening of the shutter by means of a spring and opening of the shutter by means of a motor, but also enables independent control of an aperture setting and a shutter speed.

FIG. 10 shows a conventional example of a camera shutter. In FIG. 10, an opening lever 107 is urged in the opening direction by an opening spring 107d, and a closing lever 110 is urged in the closing direction by a closing spring 110d. The opening lever 107 and the closing lever 110 are associated with electromagnets 115 and 112, respectively. An opening waveform for the shutter suitable for an intended photographing operation is obtained by controlling, with restraint, the operation timings of the opening lever 107 and the closing lever 110 by controlling the energization of the two electromagnets by means of an electronic circuit 113.

The conventional shutter configuration requires spaces for accommodating the two electromagnets and electric power for energizing the electromagnets, which are significant factors hindering the reduction of the size and power consumption of the shutter.

SUMMARY OF THE INVENTION

In view of the above, an object of the present invention is to reduce the size and power consumption of a camera shutter which can control the opening waveform of the shutter in accordance with an intended photographing operation.

The invention is directed to a camera shutter in which after the aperture setting of the shutter is set to a prescribed value by a closing member by operation of a driving member that is rotated forward or backward by a motor, a sector is opening by an opening member and an opening is closed by the closing member. To attain the above object, according to the invention, when the driving member starts its operation from a first position, the opening member is restrained by an opening control portion of the driving member. On the other hand, when the driving member starts its operation from a second position, the opening member is restrained by an opening restraint member.

DETAILED DESCRIPTION OF THE PREFERRED EMBODIMENT

Figure 1:
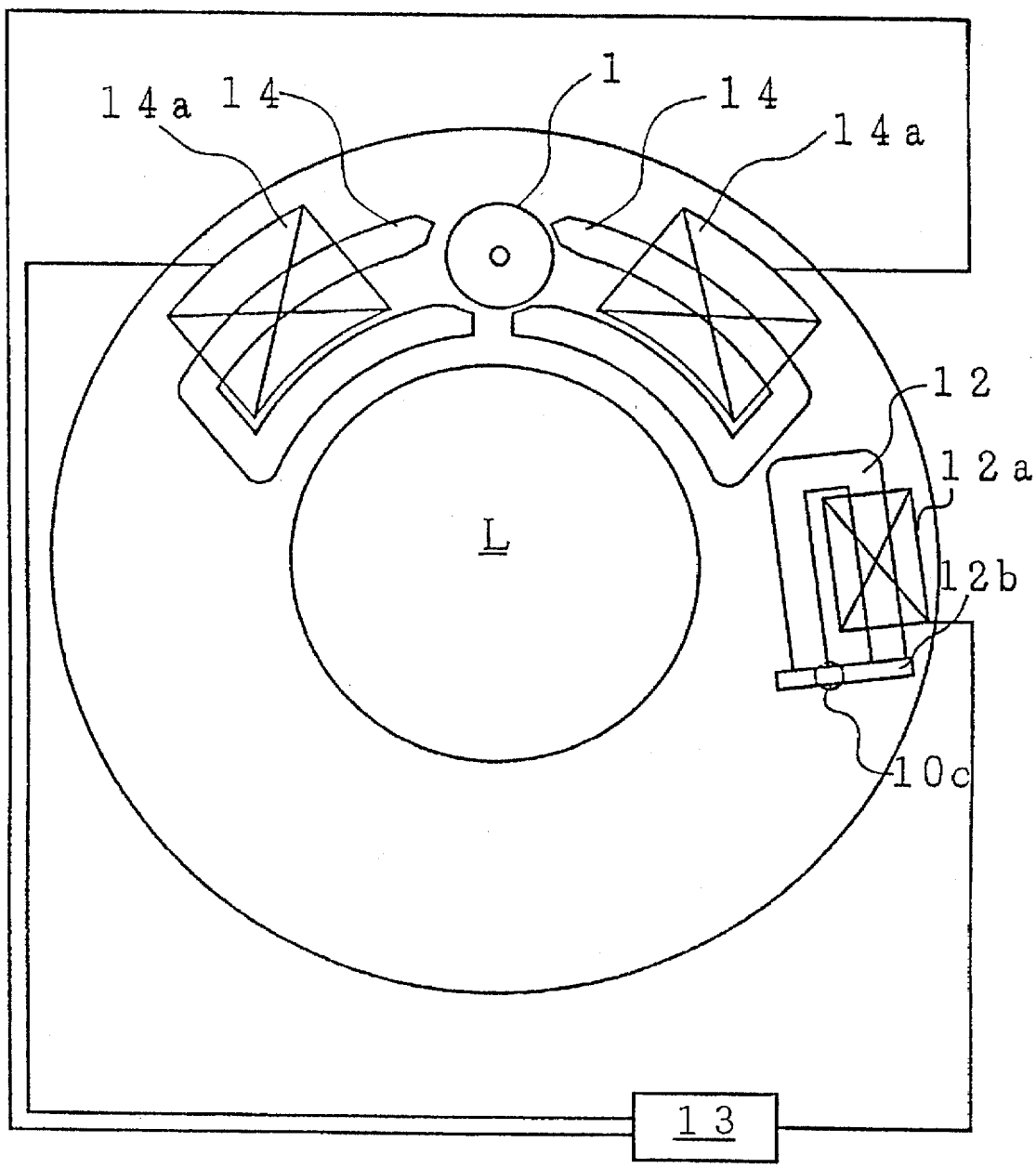
FIG. 1 is a plan view of a step motor according to an embodiment of the present invention.

An embodiment of the present invention will be described with reference to the accompanying drawings. As shown in FIG. 1, a shutter according to this embodiment is driven by a known step motor comprising a permanent magnet rotor 1, stators 14 and coils 14a. An electromagnet 12 is disposed adjacent to one of the stators 14, is magnetized by a coil 12a, and an iron piece 12b is in a fitting relationship with an operating portion 10c of a closing member or lever 10 (described later).

An electronic circuit 13 controls the forward/backward rotation of the step motor by applying prescribed drive pulses to the coils 14a, and also controls the energization the coils 12a of the electromagnet 12 in a selective manner. The electronic circuit 13 can control the opening waveform of the shutter in accordance with an intended photographing operation either by the use of springs or a motor. If a motor is used as a driving force for opening and closing the shutter, a driving member or ring 3 starts its operation from a first position. However, if springs are used to open and close the shutter, the driving ring 3 starts its operation from a second position.

Figure 2:
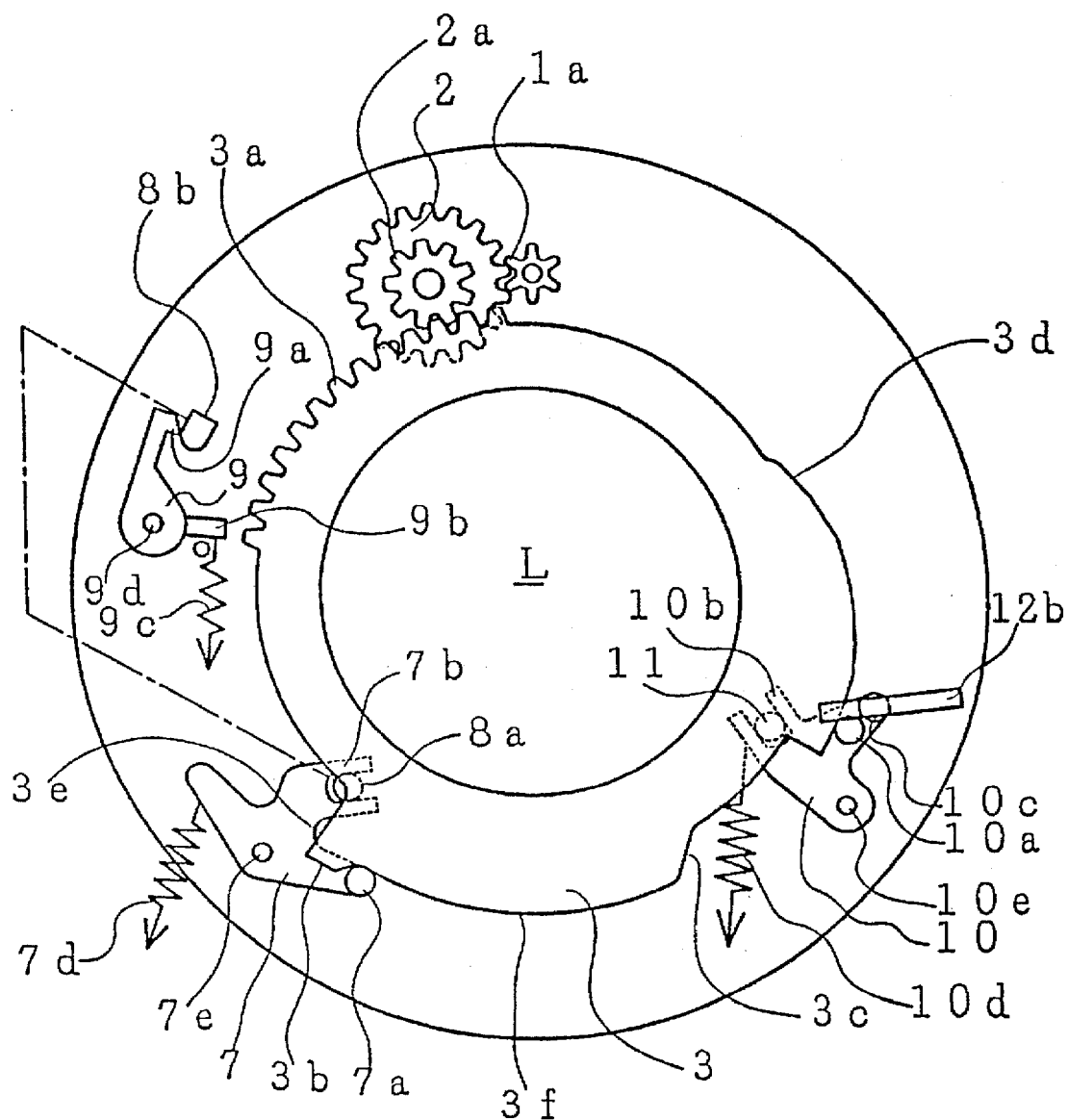
FIG. 2 is a plan view of a shutter according to the embodiment of FIG. 1 before the start of its operation.

In FIG. 2, a pinion 1a is so supported as to rotate together with the permanent magnet rotor 1 of the step motor. A gear 2, which is integral with a pinion 2a, engages the pinion 1a and is rotatably supported by a shaft. The driving member ring 3 has a gear 3a that engages the pinion 2a, control portions comprising cam surfaces 3b, 3c and 3d, an end portion 3e, and a circumference portion 3f, and is so supported as to be rotatable about a photographing lens L.

Figure 11:
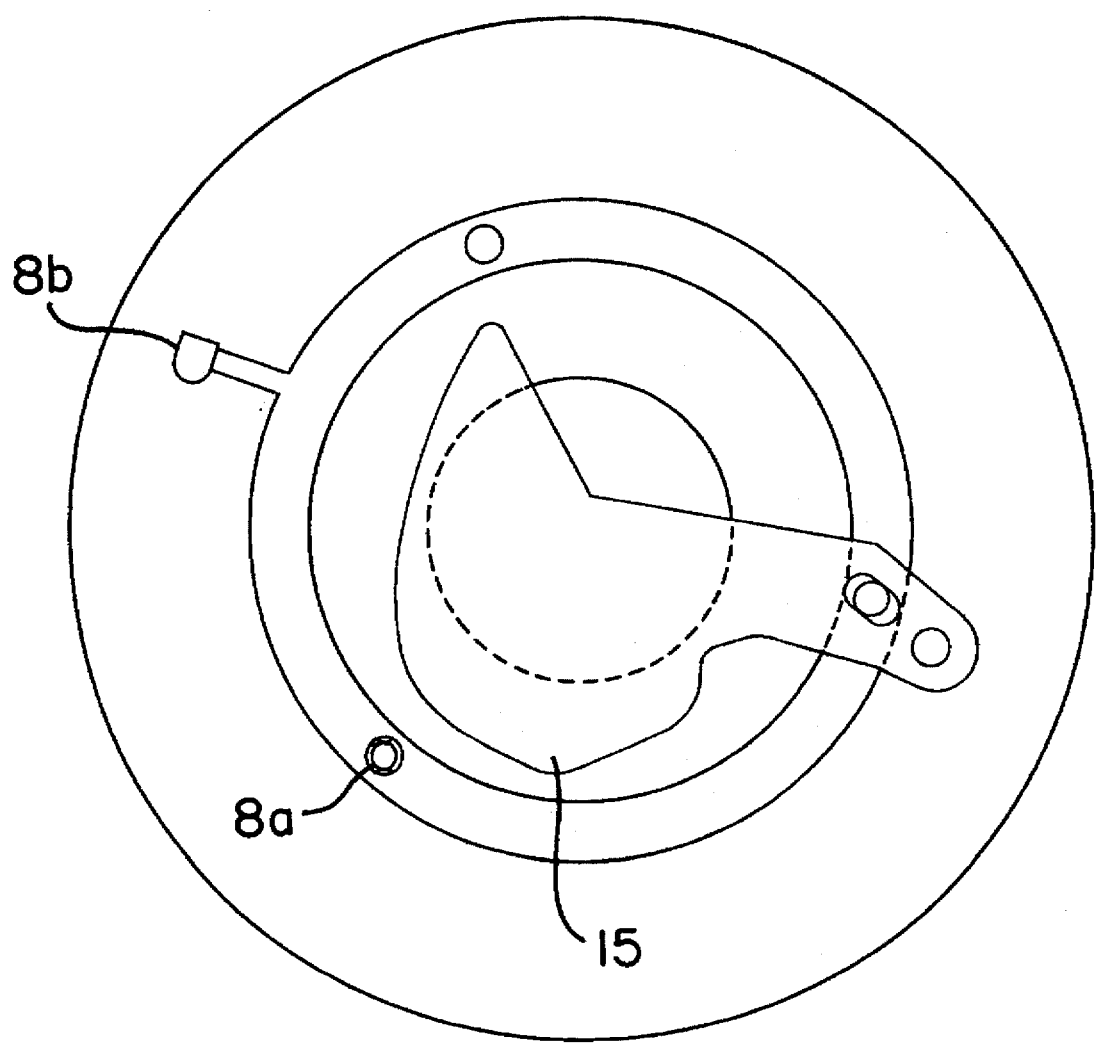
FIG. 11 is a plan view of the sectors (only one shown) according to the embodiment of FIG. 1.

An opening member or lever 7 has a fork portion 7b and an operating portion 7a that is to engage the cam portions 3b and 3c and the circumference portion 3f of the driving ring 3. The opening lever 7 is given a counterclockwise rotational force by a spring 7d, and is rotatably supported by a shaft 7e. A pin 8a, which causes sectors 15 (only one sector shown in FIG. 11) to operate, engages the fork portion 7b. In the initial state, the operating portion 7a is in contact with the circumference portion 3f of the driving ring 3, whereby the opening lever 7 is prevented from rotating. Thus the circumference portion 3f constitutes an opening control portion for controlling the operation of the opening lever 7.

Figure 12:
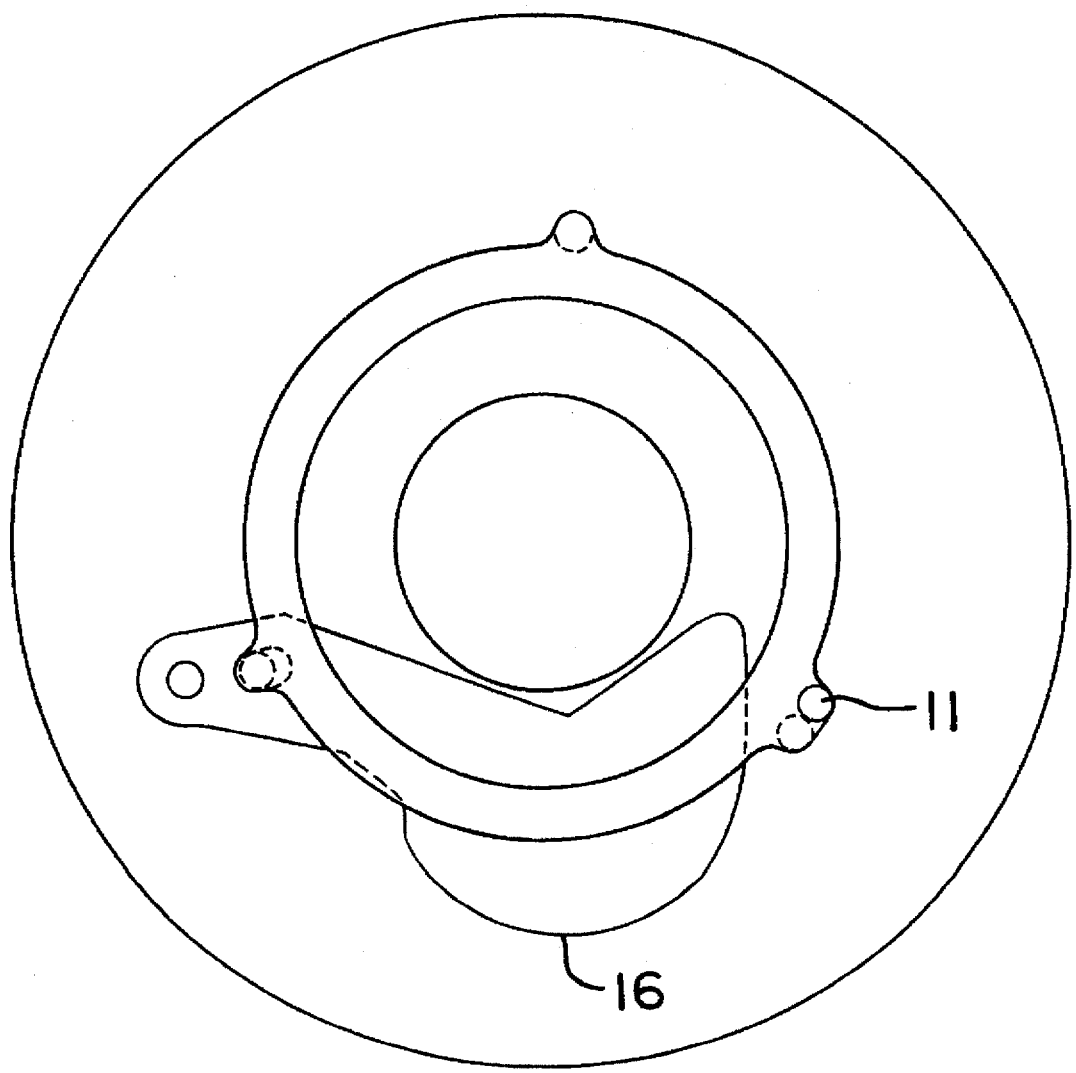
FIG. 12 is a plan view of the diaphragm blades (only one shown) according to the embodiment of FIG. 1.

An engaging lever 9 has a nail portion 9a and an arm portion 9b that is to engage the end portion 3e of the driving ring 3. The engaging lever 9 is given a clockwise rotational force by a spring 9c, and is rotatably supported by a shaft 9d. An engaging portion 8b rotates about the photographing lens L together with the pin 8a, and engages the nail portion 9a. In the initial state, the nail portion 9a is in contact with a side face of the engaging portion 8b. The closing lever 10 has a fork portion 10b, the operating portion 10c, and a pin 10a that is to engage the cam portion 3d of the driving ring 3. The closing lever 10 is given a counterclockwise rotational force by a spring 10c, and is rotatably supported by a shaft 10e. A pin 11, which causes diaphragm blades 16 (only one diaphragm blade shown in FIG. 12) to operate, engages the fork portion 10b.

When the iron piece 12b, which is in a fitting relationship with the operating portion 10c, is attracted and held by the electromagnet 12, the closing lever 10 is forced to be non-operational against the force of the spring 10d.

A description will be made of how the shutter having the above configuration performs an exposure operation in accordance with a preset aperture setting using springs as the driving force to open and close the shutter. When the step motor rotates backward or counterclockwise from the state of FIG. 2, the rotor 1 rotates counterclockwise and the driving ring 3 is caused by the gear 3a, via the gear 2, to rotate counterclockwise. As a result, the operating portion 7a of the opening lever 7 is pushed by the left end portion of the cam portion 3b, so that the opening lever 7 rotates clockwise against the force of the spring 7d. Thus, the pin 8a is rotated counterclockwise by the fork portion 7b, and the engaging portion 8b is also rotated counterclockwise.

Figure 3:
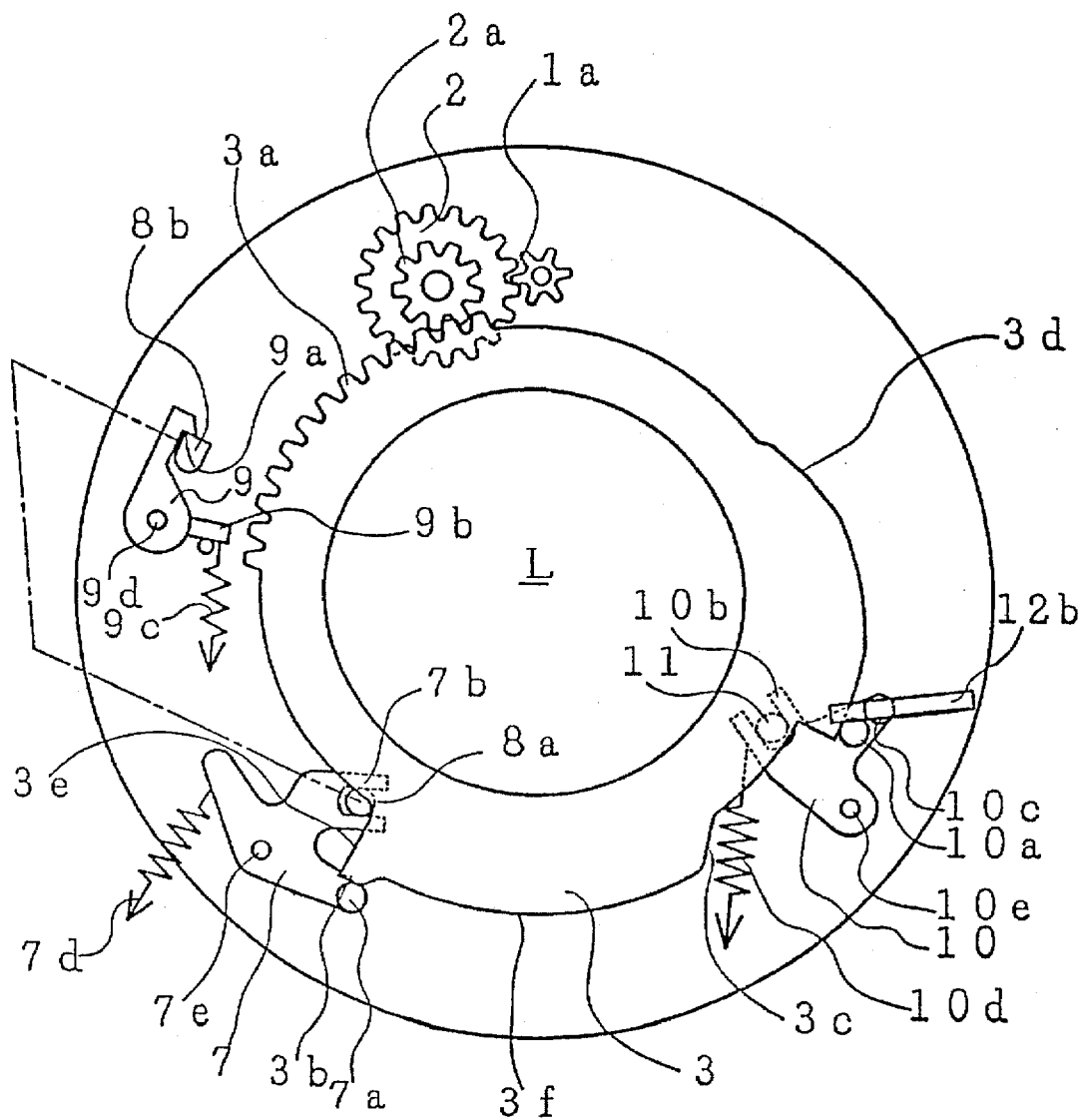
FIG. 3 is a plan view of the shutter according to the embodiment of FIG. 1 in which a step motor is rotated backward.

When the engaging portion 8b reaches the position where it engages the nail portion 9a, the engaging lever 9 is caused by the spring 9c to rotate clockwise to thereby engage the engaging portion 8b. Thus, the opening lever 7 is forced to be non-operational against the force of the spring 7d (state of FIG. 3). At this point, FIG. 3 shows the operating starting position of the driving ring 3 at the second position, in which the operating portion 7a engages the cam portion 3b.

Figure 4:
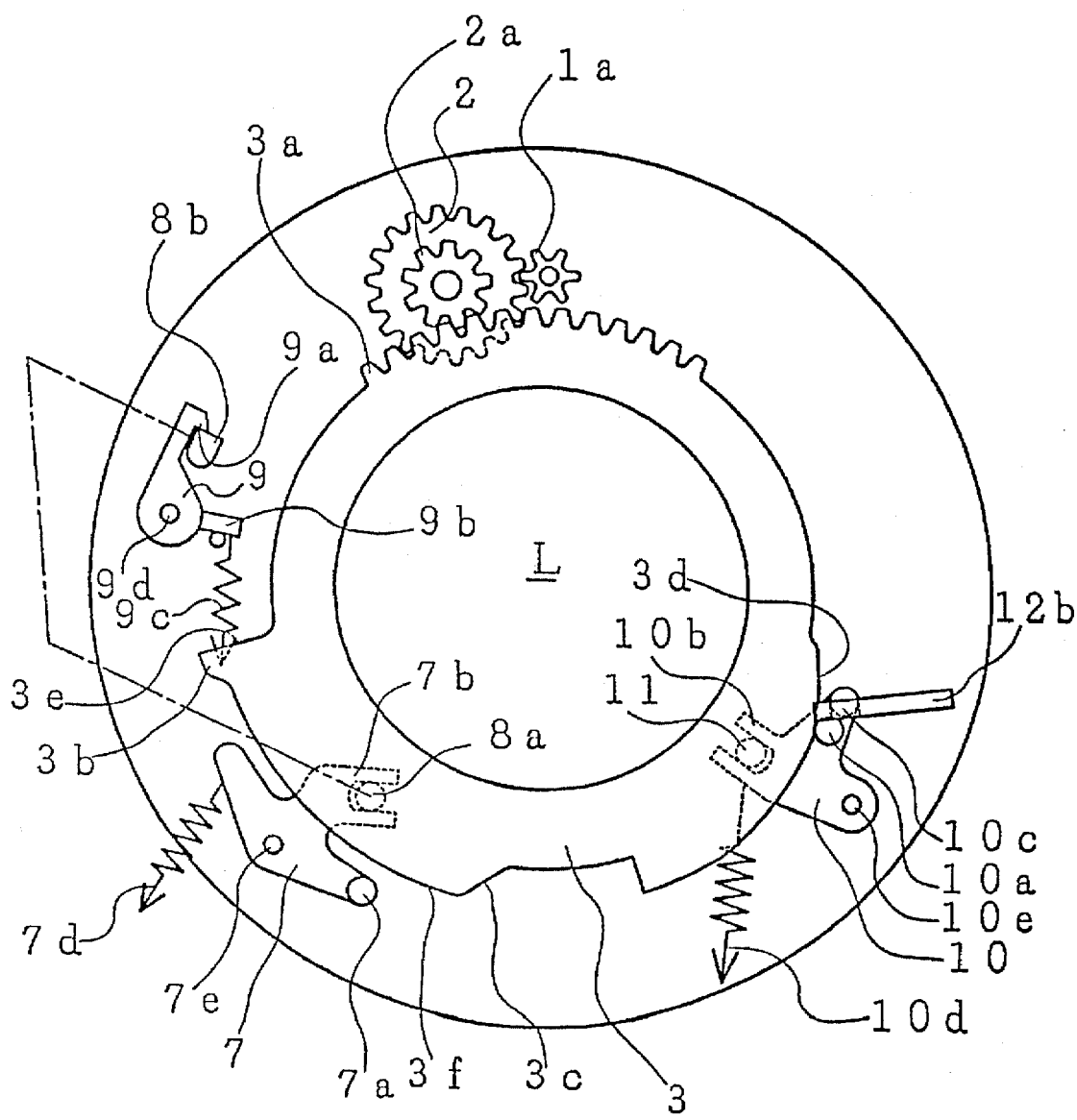
FIG. 4 is a plan view of the shutter according to the embodiment of FIG. 1 immediately after an aperture setting is set.

Then, when the step motor starts its forward or clockwise rotation, the electronic circuit 13 controls, in synchronism with the step motor, the energization timing of the coil 12a to set the diaphragm aperture of the photographing lens L. More specifically, since the coil 12a is not energized, when the driving ring 3 rotates clockwise, the pin 10a follows the cam portion 3d and the closing lever 10 is rotated counterclockwise by the spring 10d to move the pin 11. The step motor rotates forward until a prescribed aperture setting is obtained. At this point in time, the electronic circuit 13 energizes the coil 12a to magnetize the electromagnet 12. Thus, the iron piece 12b is attracted and held by the electromagnet 12, so that the closing lever 10 is forced to be non-operational against the force of the spring 10d at the position of the cam portion 3d of the driving ring 3 corresponding to the prescribed aperture setting (state of FIG. 4). Thus, the cam portion 3d constitutes an aperture establishment portion for controlling the operation of the closing member 10 and establishing an aperture setting.

Figure 5:
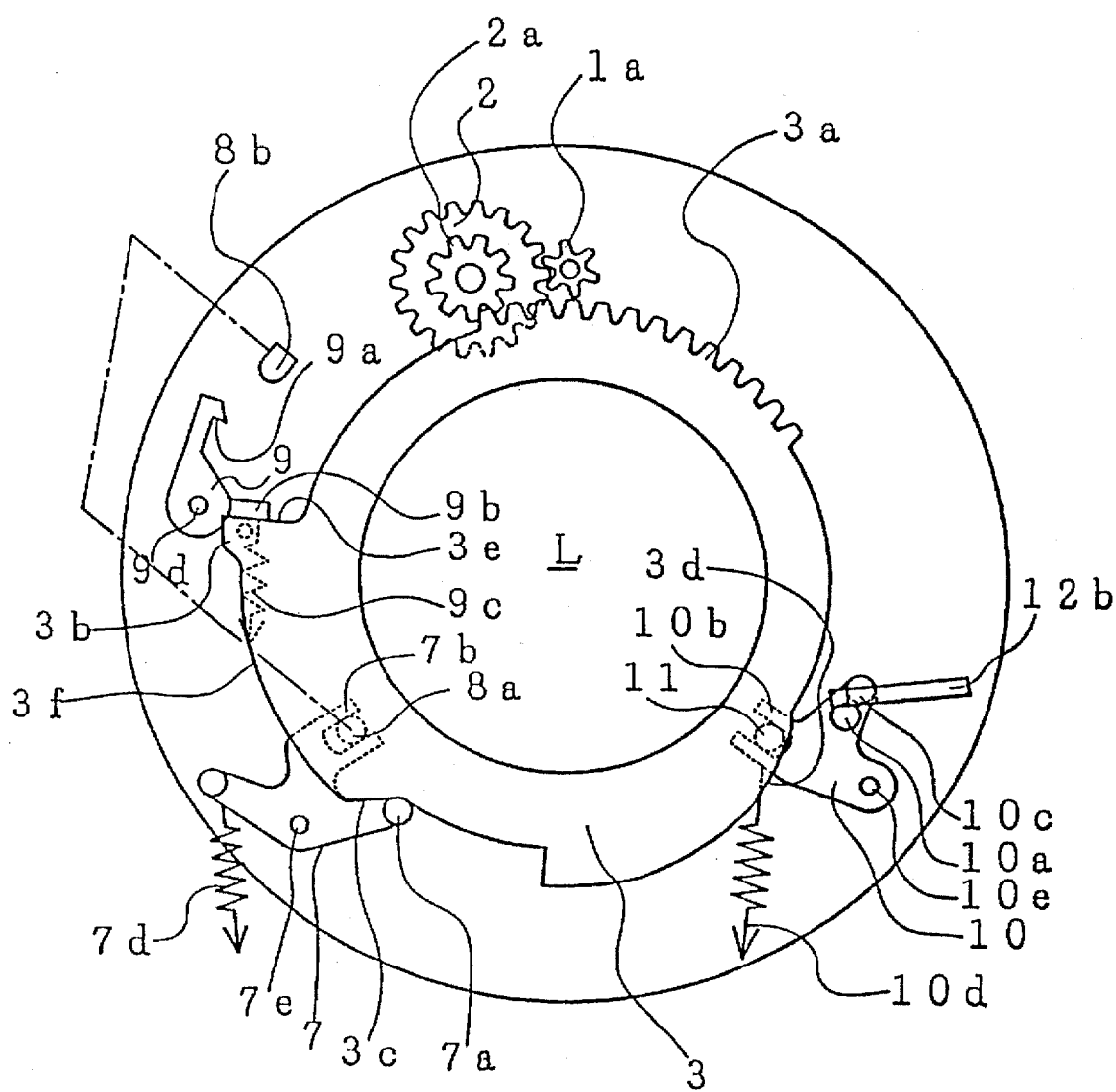
FIG. 5 is a plan view of the shutter according to the embodiment of FIG. 1 with the sectors being opened.

As the step motor continues to rotate forward, the end portion 3e strikes the arm portion 9b and then causes the engaging lever 9 to rotate counterclockwise against the force of the spring 9c to thereby release the engaging portion 8b. As a result, the urging force of the spring 7d causes the opening lever 7 to quickly rotate counterclockwise to thereby move the pin 8a. Thus, the sectors 15 quickly operate in the direction of opening the lens opening to start an exposure operation. The energization of the step motor is stopped at this point in time (state of FIG. 5). If necessary, a flash light is also emitted at this point in time.

Figure 6:
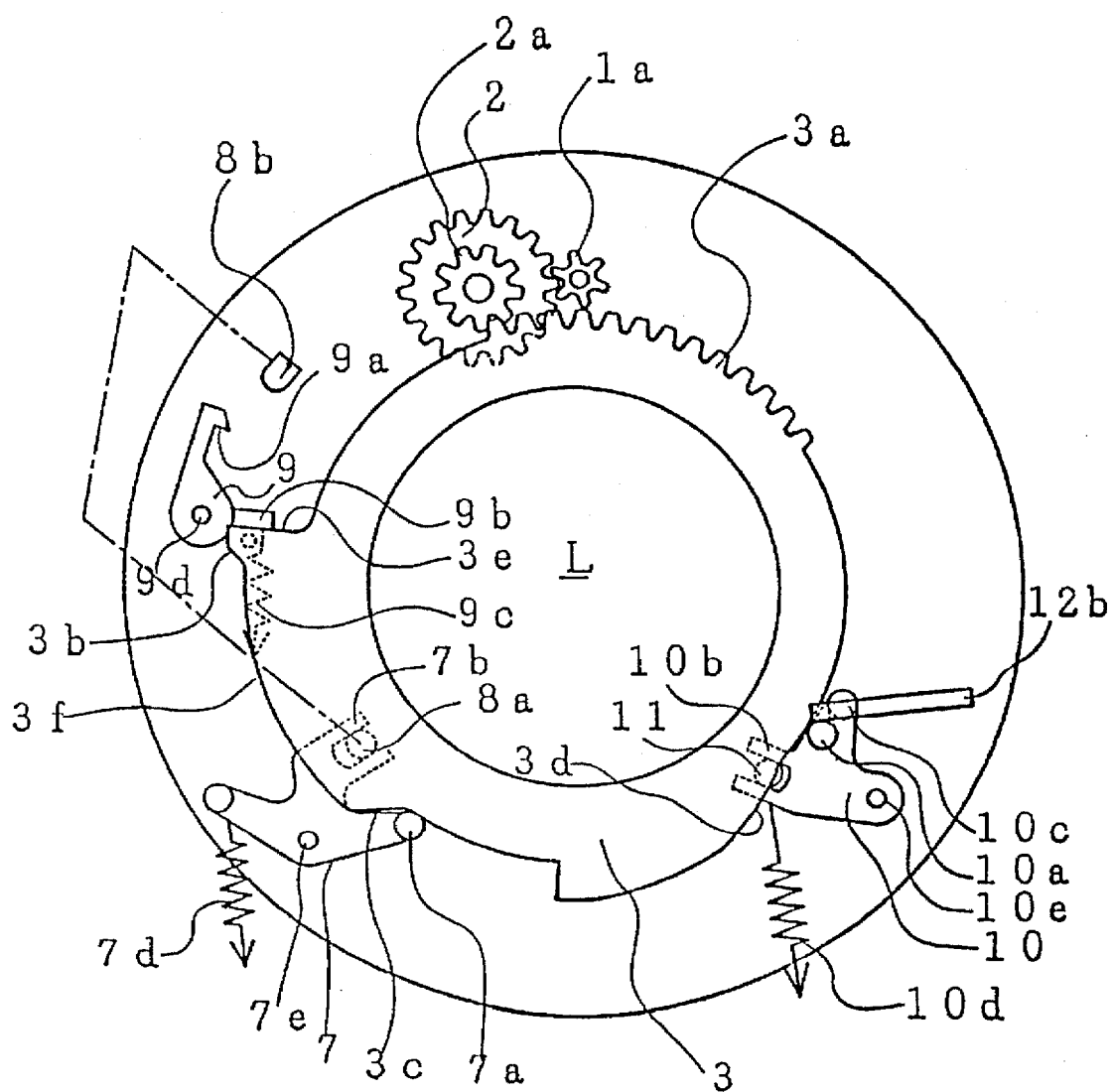
FIG. 6 is a plan view of the shutter according to the embodiment of FIG. 1 immediately after the diaphragm blades are closed.

As described above, the lens opening is set at the aperture setting corresponding to the position of the cam portion 3d of the driving ring 3 where the electromagnet 12 restrains the closing lever 10. After a lapse of a prescribed exposure time, the electronic circuit 13 stops energizing the coil 12a to demagnetize the electromagnet 12. As a result, the spring 10d quickly rotates the closing lever 10 counterclockwise, so that the pin 11 is moved to quickly close the diaphragm blades 16. Thus, the exposure is finished. Since the energization of the coil 14a of the step motor was stopped when the engaging portion 8b was released, the electromagnet 12 is not influenced by leakage flux of the coil 14a and, therefore, the iron piece 12b can move smoothly (state of FIG. 6). Thereafter, as the step motor rotates backward, the driving ring 3 rotates counterclockwise.

Figure 7:
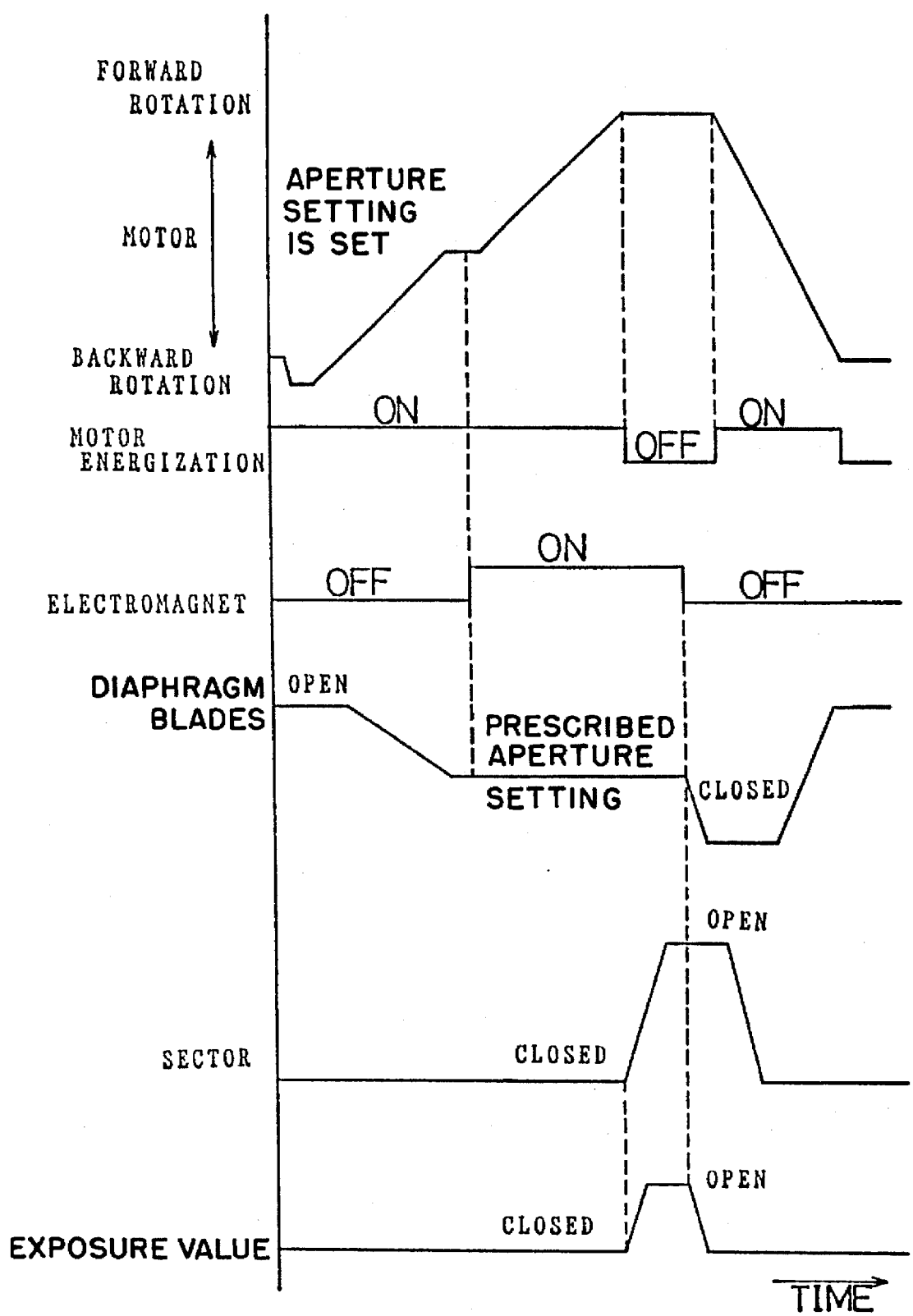
FIG. 7 is a diagram showing an opening/closing shutter operation by springs according to the embodiment of FIG. 1.

On the other hand, the operating portion 7a is pushed by the cam portion 3c of the driving ring 3, so that the opening lever 7 rotates clockwise against the force of the spring 7d and the pin 8a moves to close the sectors 15 that are in an open state. As the step motor further rotates backward, the pin 10a is pushed by the cam portion 3d and the closing lever 10 rotates clockwise against the force of the spring 10d. As a result, the pin 11 moves to open the diaphragm blades 16 that are in a closed state. The step motor stops when the shutter returns to the initial state of FIG. 1, to complete one sequence of operation. FIG. 7 shows how the above exposure operation proceeds with a lapse of time.

Next, a description will be made of another type of exposure operation using a step motor as the driving force to open and close the shutter. Only the features different than the above operation will be explained below.

The operation starting position of the driving ring 3 is shown in FIG. 2 at the first position thereof, where the operating portion 7a engages the circumference portion 3f. The step motor rotates forward immediately from the state of FIG. 2. Since the rotation of the opening lever 7 is restrained by the circumference portion 3f of the driving ring 3, the pin 8a does not rotate counterclockwise and, therefore, the nail portion 9a and the engaging portion 8b do no engage each other.

Figure 8:
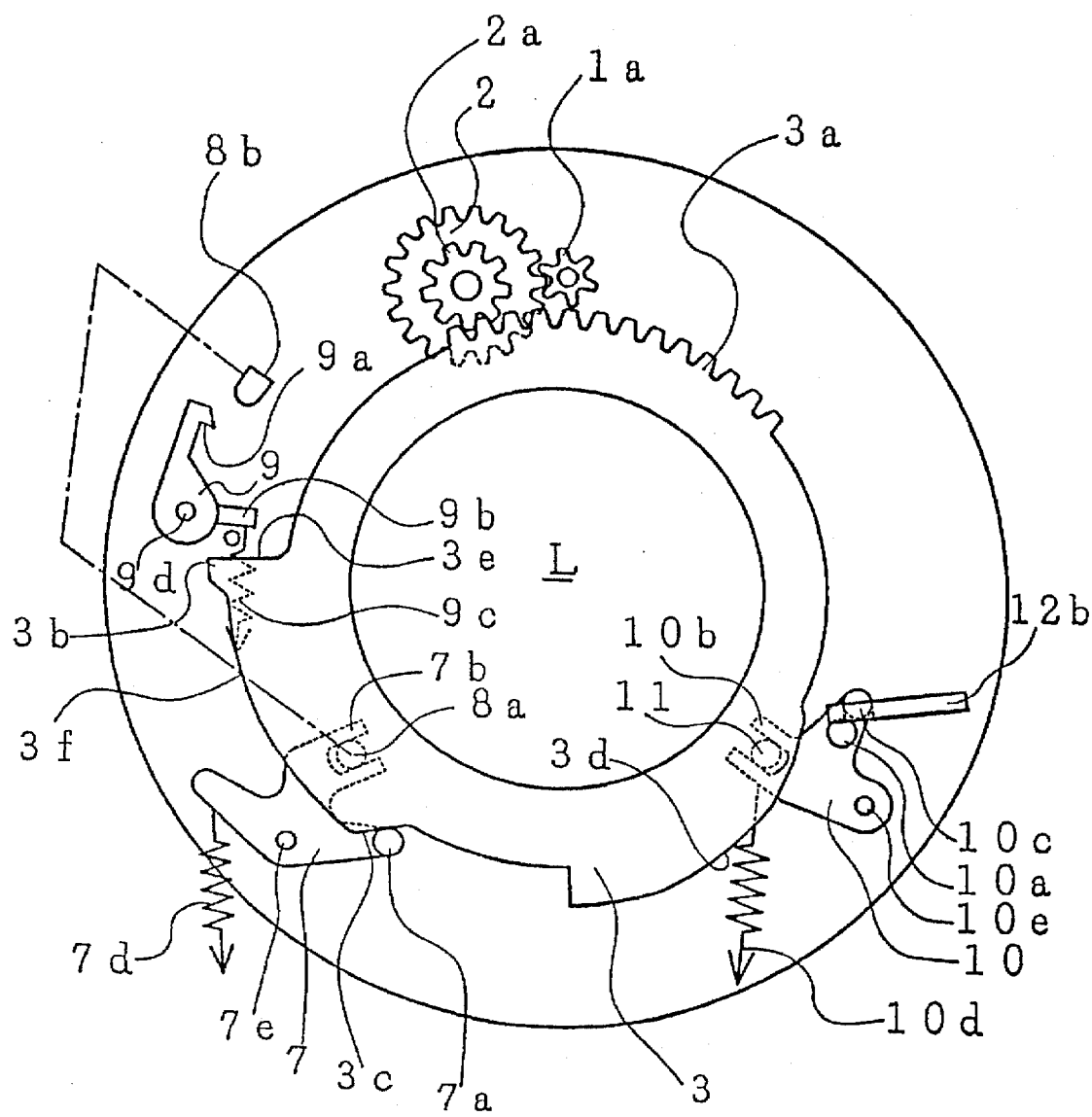
FIG. 8 is a plan view of the shutter according to another aspect of the embodiment of FIG. 1 when the sectors being opened.

After the aperture setting is set in the same manner as in the above operation, as the step motor further rotates forward, the urging force of the spring 7d causes the operating portion 7a to follow the slope of the cam portion 3c, so that the opening lever 7 rotates counterclockwise about the shaft 7e. As a result, the pin 8a opens the sectors 15 at a speed that depends on the forward rotation of the step motor and corresponds to the slope of the cam portion 3c, starting exposure (state of FIG. 8). Where a flash light is needed, it is emitted at a time point t1 when the opening of the sectors has reached a value corresponding to the distance to a main object.

When the exposure value has approximately reached a value corresponding to the background brightness, the electronic circuit 13 stops energizing the coil 12a to demagnetize the electromagnet 12a. As a result, the closing lever 10 operates to quickly close the diaphragm blades 16. Thus, the exposure operation is finished.

Figure 9:
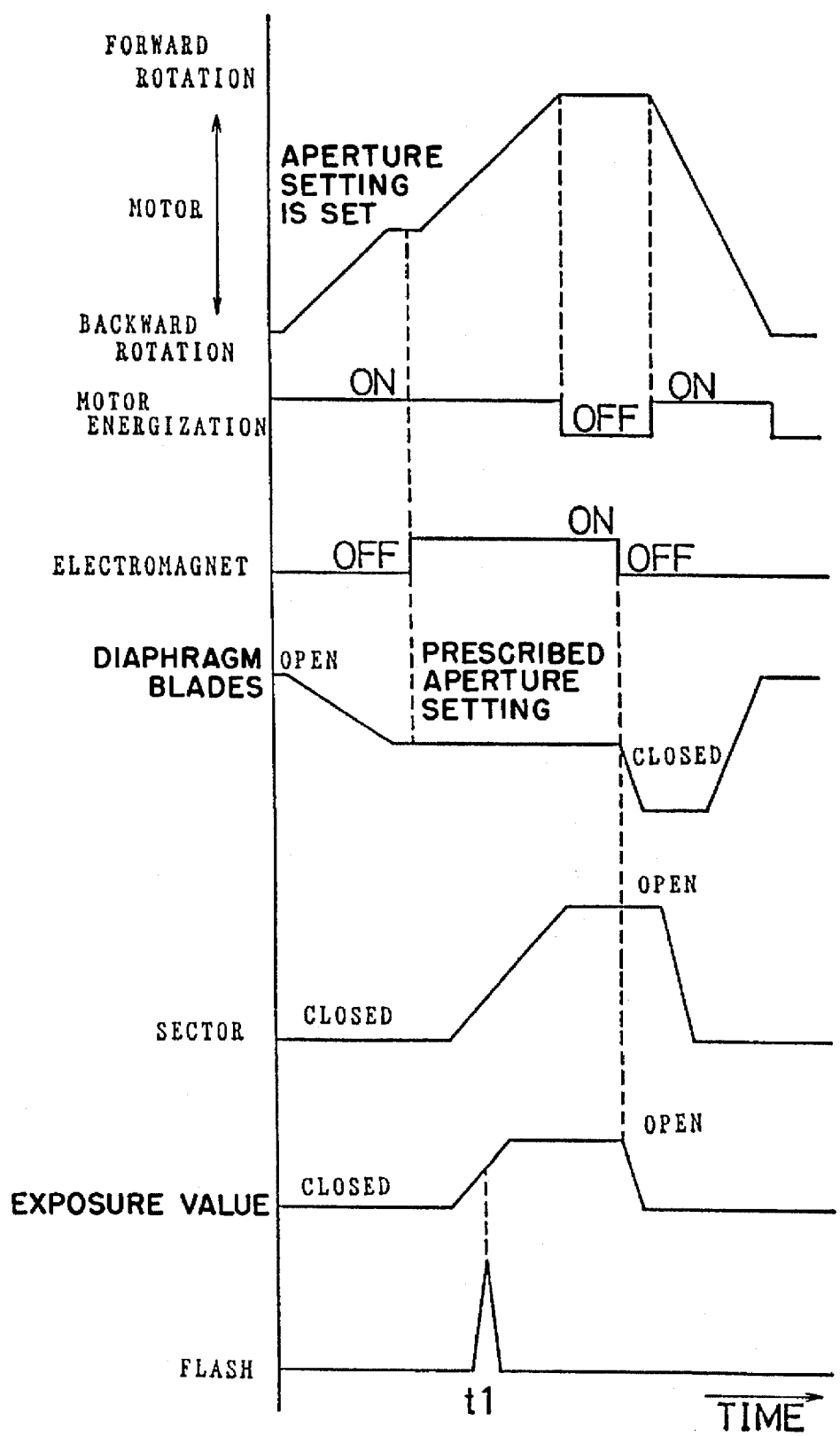
FIG. 9 is a diagram showing an opening/closing shutter operation by the step motor according to the embodiment of FIG. 1.
Figure 10:
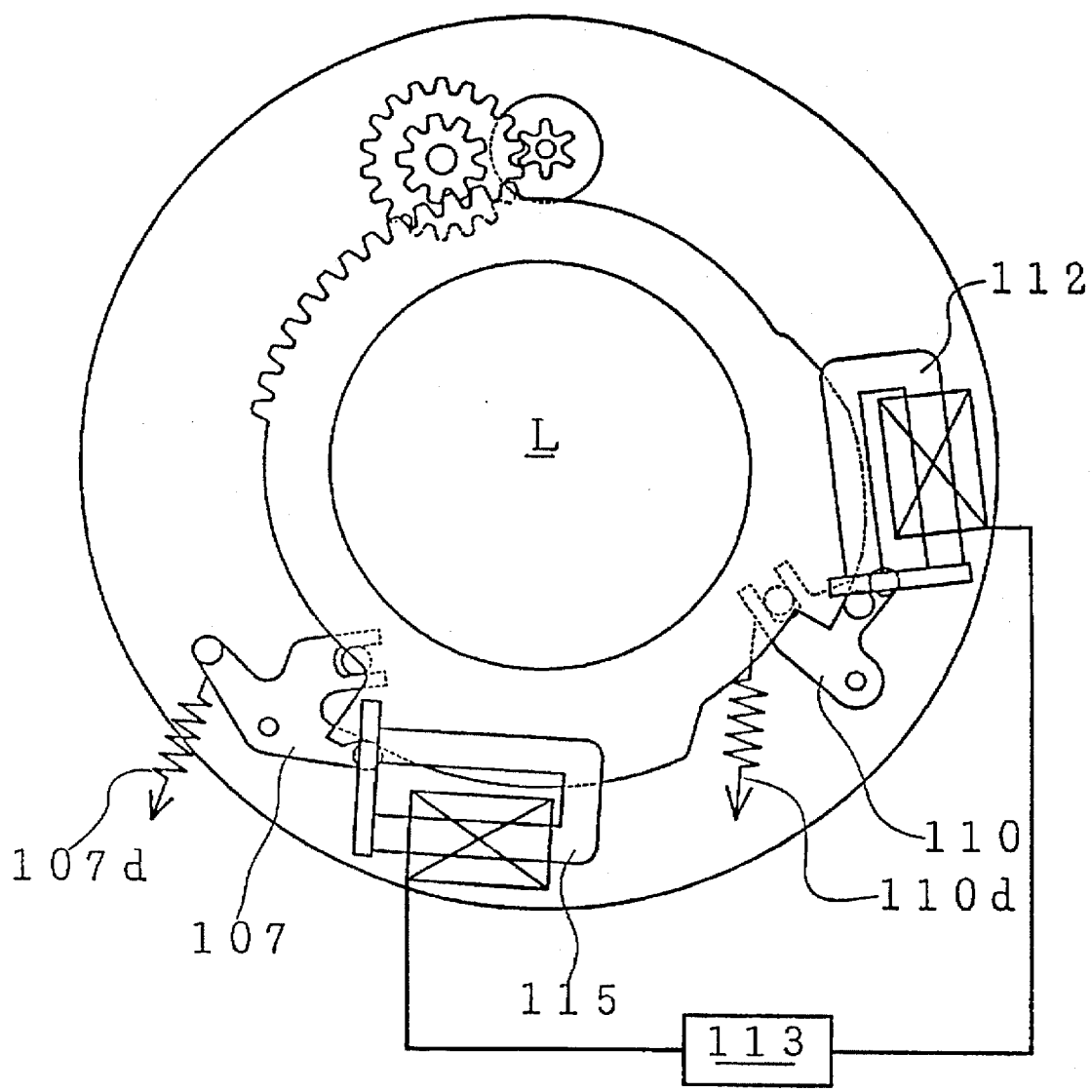
FIG. 10 is a plan view of a conventional shutter before the start of its operation.

Thereafter, as described above, as the step motor rotates backward, the driving ring 3 rotates counterclockwise while closing the sectors 15 that are in an open state and opening the diaphragm blades 16 that are in a closed state. The step motor stops when the shutter has reached the initial state of FIG. 2 to complete the exposure operation. FIG. 9 shows how the above operation proceeds with a lapse of time.

According to the operation of FIG. 7, both the control of the exposure time in accordance with the object brightness with the use of a prescribed aperture setting and the control of the aperture setting in accordance with the object brightness with the use of a prescribed exposure time can be realized based on the same concept. Either type of control can be selected manually.

Although the above description is directed to the specific case of using a step motor, other types of motors, such as an ultrasonic motor, can also be used as long as they can control their rotation speed freely. The electromagnet 12 may be of other types in which the closing lever 10 is restrained upon energization by operation of a plunger, rotation of a permanent magnet rotor, or some other proper method.

Although the above embodiment is realized in a camera in which the lens opening is closed in the initial state, the invention can also be realized in a camera, such as a single-lens reflex camera, in which the lens opening is opened in the initial state. That is, the invention can easily be realized in such a case by indirectly moving the pin 8a by an intermediate member connected through an elastic body rather than directly moving it by the opening lever 7.

As is apparent from the above description, according to the invention, the shutter can be constructed by using only a pair of electromagnets in which the shutter opening waveform can be controlled in accordance with an intended photographing operation. Therefore, the space can be saved to enable provision of a smaller shutter. Further, since the only electric power needed is that for energizing the pair of electromagnets, energy consumption can be reduced.

What is claimed is:

1. A camera shutter comprising:

a driving member having an opening control portion and an aperture establishment portion, the driving member being controllably rotated forward or backward by a motor;

switching means for switching an operating starting position of the driving member between first and second positions;

an opening member for opening a shutter sector while its operation is controlled by the opening control portion;

an opening spring for biasing the opening member in a direction of opening the shutter sector;

an opening restraint member for restraining the operation of the opening member against the bias of the opening spring;

a closing member for closing a diaphragm blade while its operation is controlled by the aperture establishment portion to set an aperture setting at a prescribed value;

a closing spring for biasing the closing member in a direction of closing the diaphragm blade; and a closing restraint member for controlling, against the bias of the closing spring, an activation timing of the closing member;

wherein after an aperture setting is set at a prescribed value by the closing member, the shutter sector is opened by the opening member and the diaphragm blade is closed by the closing member; and wherein when the driving member starts its operation from the first position, the opening member is restrained by the opening control portion of the driving member, and when the driving member starts its operation from the second position, the opening member is restrained by the opening restraint member.

2. A camera shutter comprising: a driving member having first and second control portions; means for rotating the driving member in forward and reverse directions; switching means for switching an operating starting position of the driving member between first and second positions; an opening member controlled by the first control portion of the driving member; first biasing means for biasing the opening member in the direction of opening the shutter; first restraining means for restraining an operation of the opening member and resisting the bias of the first biasing means; a closing member controlled by the second control portion of the driving member; second biasing means for biasing the closing member in the direction of closing the shutter; and second restraining means for restraining an operation of the closing member and resisting the bias of the second biasing means; wherein when the driving member starts its operation from the first position, the opening member is restrained by the first control portion of the driving member, and when the driving member starts its operation from the second position, the opening member is restrained by the first restraining means.

3. A camera shutter as claimed in claim 2; wherein the first control portion of the driving member comprises a circumference portion thereof.

4. A camera shutter as claimed in claim 2; wherein the second control portion of the driving member comprises a cam surface thereof for establishing an aperture setting at a prescribed value.

5. A camera shutter as claimed in claim 2; wherein the first restraining means comprises an engaging member movable between first and second positions, the engaging member being operative in the first position to restrain the operation of the opening member against the bias of the first biasing means and being operative in the second position to enable the first biasing means to bias the opening member in the direction of opening the shutter.

6. A camera shutter as claimed in claim 2; wherein the second restraining means comprises an electromagnet for restraining an activation timing of the closing member and resisting the bias of the second biasing means.

7. A camera shutter comprising: a driving member rotatable in forward and reverse directions and having first and second control portions; an opening member controlled by the first control portion of the driving member; an opening spring for biasing the opening member in the direction of opening the shutter; an engaging portion movable between first and second positions, the engaging portion being operative in the first position to restrain the operation of the opening member against the bias of the opening spring and being operative in the second position to enable the opening spring to bias the opening member in the direction of opening the shutter; a closing member controlled by the second control portion of the driving member; a closing spring for biasing the closing member in the direction of closing the shutter; an electromagnet for restraining an activation timing of the closing member and resisting the bias of the closing spring; and switching means for switching an operating starting position of the driving member between first and second positions; wherein when the driving member starts its operation from the first position, the opening member is restrained by the first control portion of the driving member, and when the driving member starts its operation from the second position, the opening member is restrained by the engaging member.

8. A camera shutter as claimed in claim 7; wherein the first control portion of the driving member comprises a circumference portion thereof.

9. A camera shutter as claimed in claim 7; wherein the second control portion of the driving member comprises a cam surface thereof for establishing an aperture setting at a prescribed value.

* * * * *